(12) United States Patent
Cho

(10) Patent No.: US 9,819,854 B2
(45) Date of Patent: Nov. 14, 2017

(54) MOBILE TERMINAL AND METHOD FOR CONTROLLING THE SAME

(71) Applicant: LG ELECTRONICS INC., Seoul (KR)

(72) Inventor: Daeduek Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 14/443,302

(22) PCT Filed: Jan. 20, 2015

(86) PCT No.: PCT/KR2015/000569
§ 371 (c)(1),
(2) Date: May 15, 2015

(87) PCT Pub. No.: WO2015/190666
PCT Pub. Date: Dec. 17, 2015

(65) Prior Publication Data
US 2016/0286118 A1    Sep. 29, 2016

(30) Foreign Application Priority Data
Jun. 11, 2014 (KR) .................. 10-2014-0071022

(51) Int. Cl.
*H04N 5/225* (2006.01)
*H04N 5/232* (2006.01)
(Continued)

(52) U.S. Cl.
CPC ....... *H04N 5/23216* (2013.01); *G06F 1/1694* (2013.01); *G06F 3/04886* (2013.01);
(Continued)

(58) Field of Classification Search
CPC ........... H04N 5/23216; H04N 5/23245; H04N 5/23293; H04N 5/2257; G06F 1/3218;
(Continued)

(56) References Cited

U.S. PATENT DOCUMENTS 8,866,879 B2 * 10/2014 Seen ................. H04N 5/23293
348/36
9,088,719 B2 * 7/2015 Yi ...................... G06F 3/04883
(Continued)

FOREIGN PATENT DOCUMENTS

EP     2393000    12/2011
EP     2706447    3/2014

OTHER PUBLICATIONS

PCT International Application No. PCT/KR2015/000569, Written Opinion of the International Authority dated Apr. 17, 2015, 11 pages.
(Continued)

*Primary Examiner* — Tuan Ho
*Assistant Examiner* — Marly Camargo
(74) *Attorney, Agent, or Firm* — Lee, Hong, Degerman, Kang & Waimey

(57) ABSTRACT

A mobile terminal and a method for controlling the same are disclosed. The mobile terminal and method for controlling same can recognize a first input, which is applied to a first area of the display unit on which a preview image obtained by driving a camera is displayed, as a triggering signal for entering a specific photographing mode and enter the specific photographing mode, upon reception of the first input. According to the present invention, grip of the mobile terminal can be improved by processing an operation of gripping the mobile terminal as a valid input.

13 Claims, 18 Drawing Sheets

(51) Int. Cl.
    *G06F 1/16* (2006.01)
    *G06F 3/0488* (2013.01)
(52) U.S. Cl.
    CPC ....... *H04N 5/2257* (2013.01); *H04N 5/23245* (2013.01); *H04N 5/23293* (2013.01); *G06F 2203/04101* (2013.01); *H04M 2250/22* (2013.01); *H04M 2250/52* (2013.01)
(58) Field of Classification Search
    CPC ............... G06F 1/1694; G06F 3/04886; G06F 2203/04101; H04M 2250/22; H04M 2250/52
    USPC ............... 348/333.02, 211.2, 14.03; 345/173
    See application file for complete search history.

(56) References Cited

U.S. PATENT DOCUMENTS

| | | | |
|---|---|---|---|
| 9,137,437 B2* | 9/2015 | Choi | .................. H04N 5/23216 |
| 2005/0094000 A1 | 5/2005 | Son et al. | |
| 2006/0026521 A1 | 2/2006 | Hotelling et al. | |
| 2010/0053342 A1* | 3/2010 | Hwang | ................ H04N 5/2259 348/207.99 |
| 2010/0097322 A1 | 4/2010 | Hu et al. | |
| 2011/0060986 A1 | 3/2011 | Yang | |
| 2011/0300910 A1* | 12/2011 | Choi | ..................... H04W 88/02 455/566 |
| 2012/0105579 A1* | 5/2012 | Jeon | ..................... H04N 5/2258 348/38 |
| 2012/0113216 A1 | 5/2012 | Seen et al. | |
| 2013/0263029 A1 | 10/2013 | Rossi et al. | |
| 2013/0342482 A1 | 12/2013 | Kim et al. | |
| 2014/0022190 A1 | 1/2014 | Tokutake | |
| 2015/0029382 A1* | 1/2015 | Chun | .................. G06F 3/04883 348/333.03 |

OTHER PUBLICATIONS

European Patent Office Application No. 1574173.0, Search Report dated Aug. 2, 2016, 10 pages.

* cited by examiner

【Figure 1a】
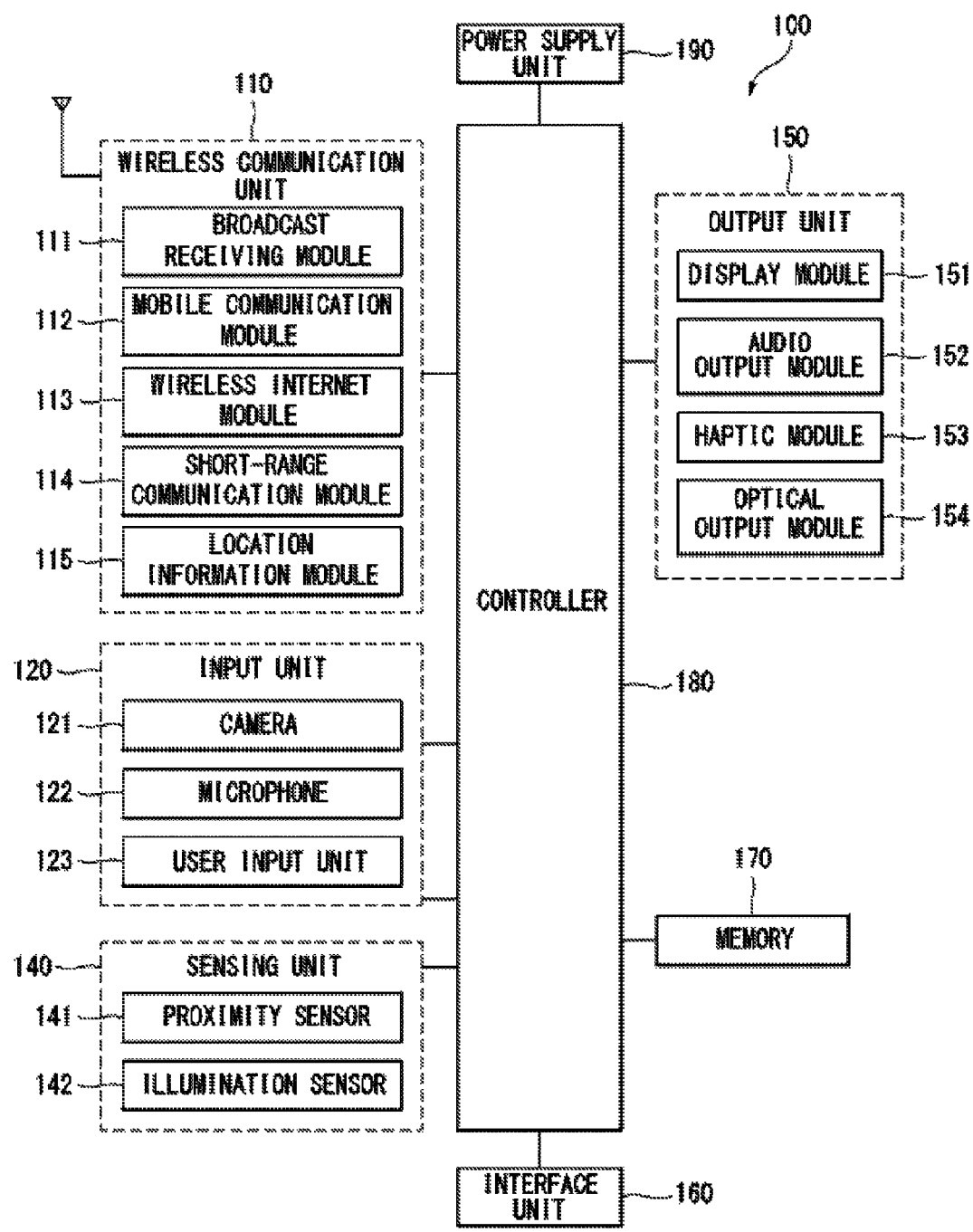

[Figure 1b]
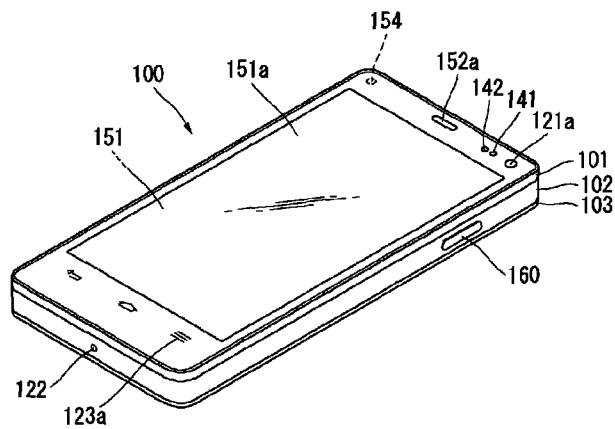
[Figure 1c]
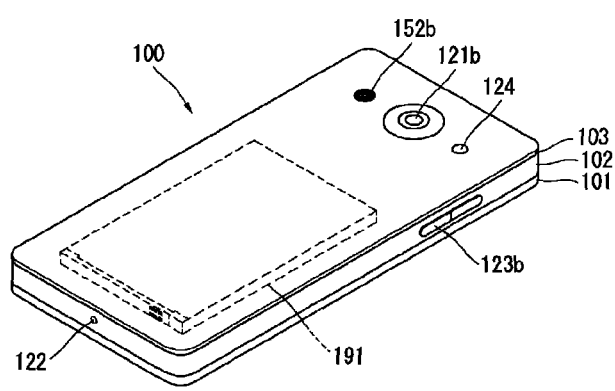
[Figure 2]
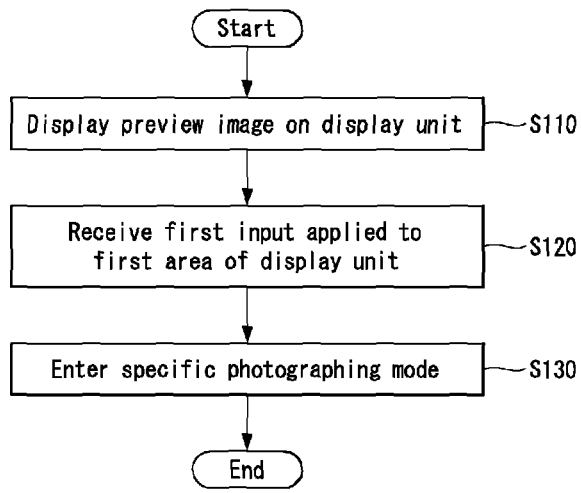

[Figure 3]
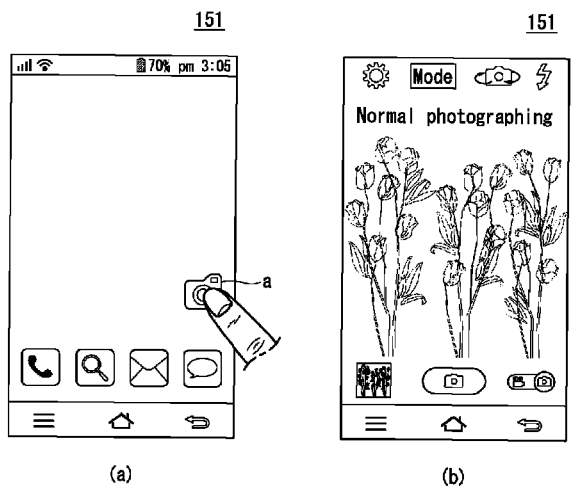
(a)　　　　　(b)
[Figure 4a]
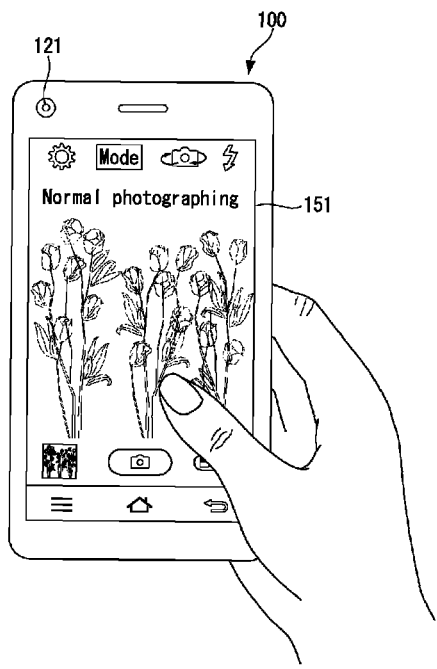

【Figure 4b】
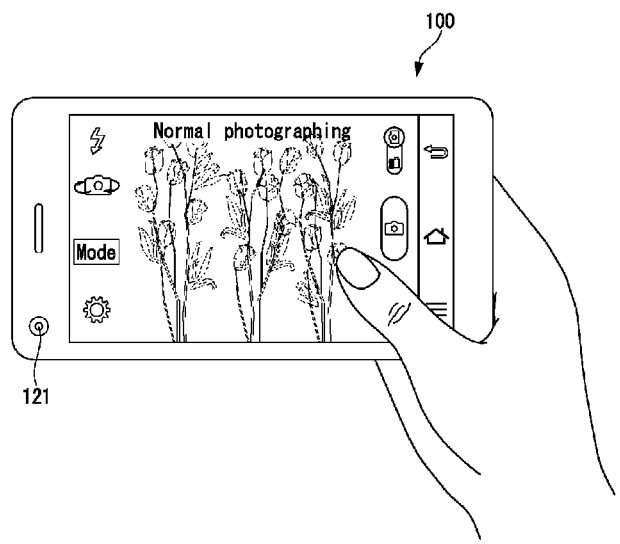
【Figure 4c】
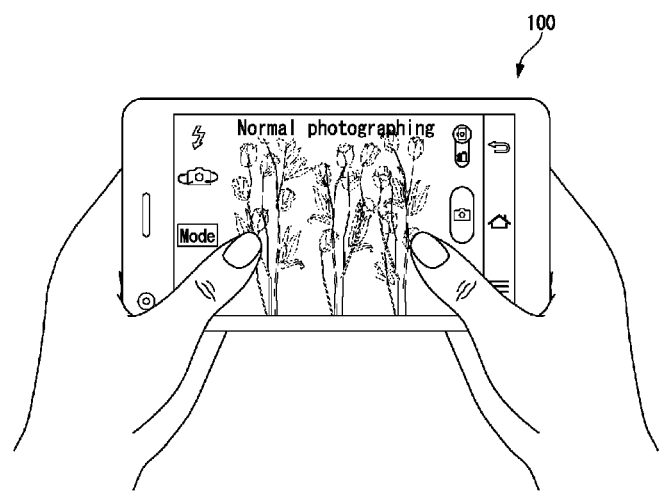

[Figure 5a]
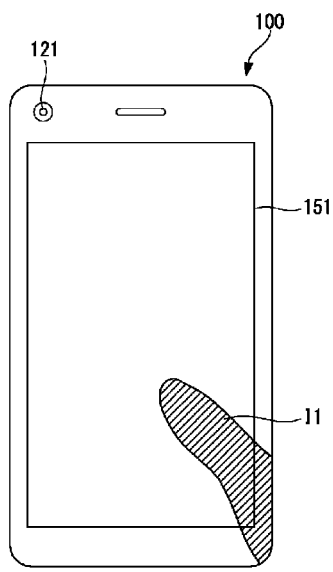
[Figure 5b]
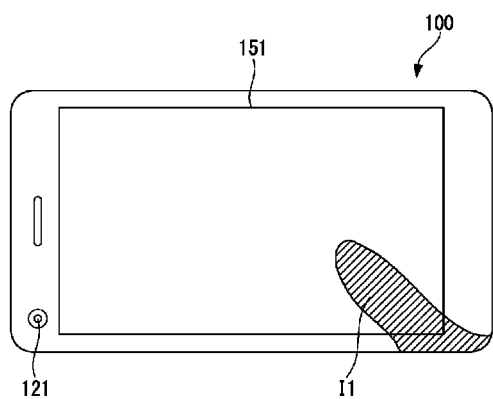

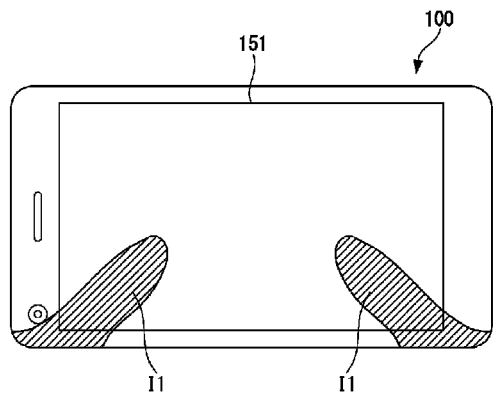
[Figure 5c]
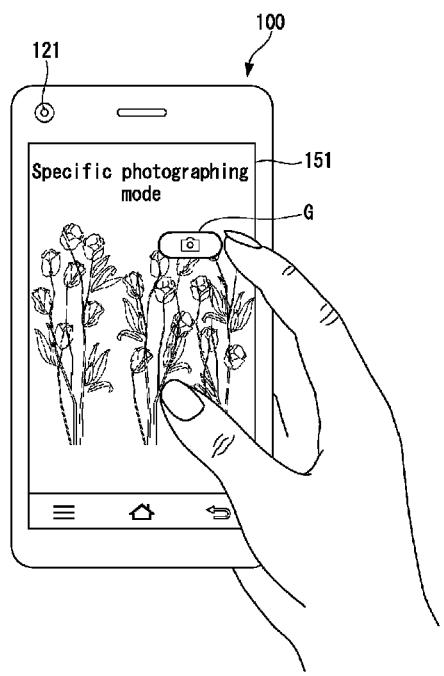
[Figure 6a]

[Figure 6b]
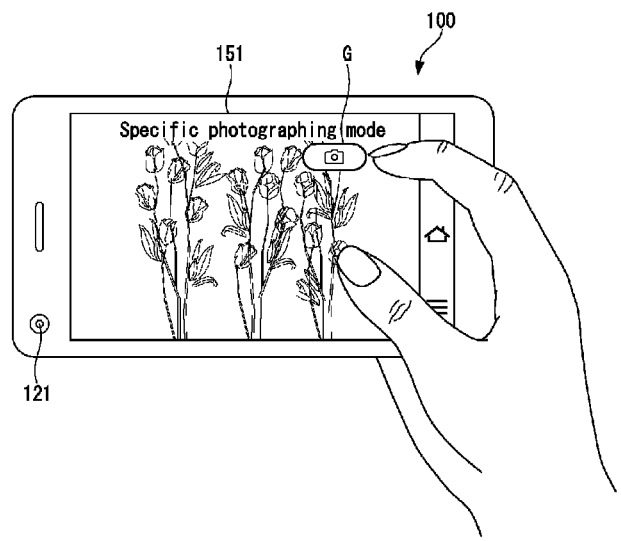
[Figure 6c]
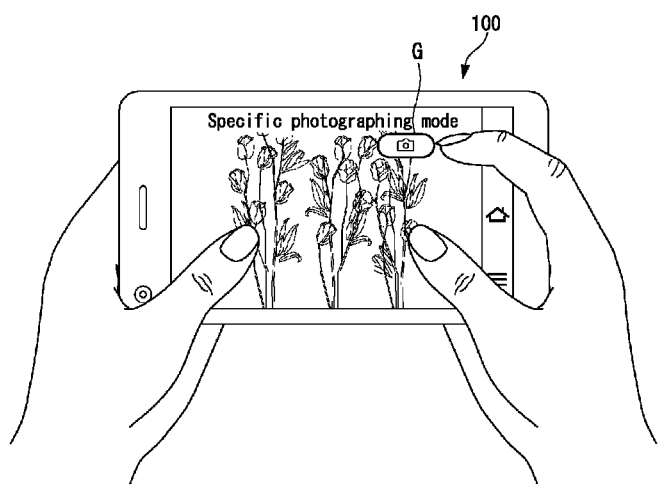

[Figure 7a]
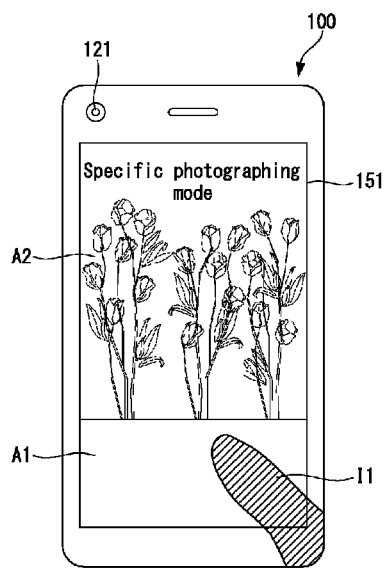
[Figure 7b]
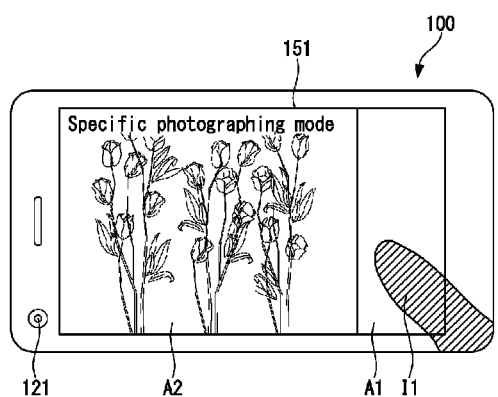

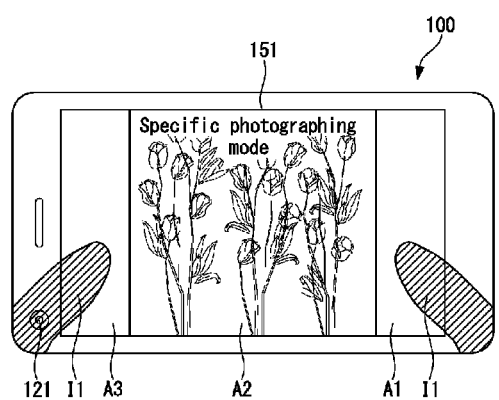
[Figure 7c]

[Figure 8]
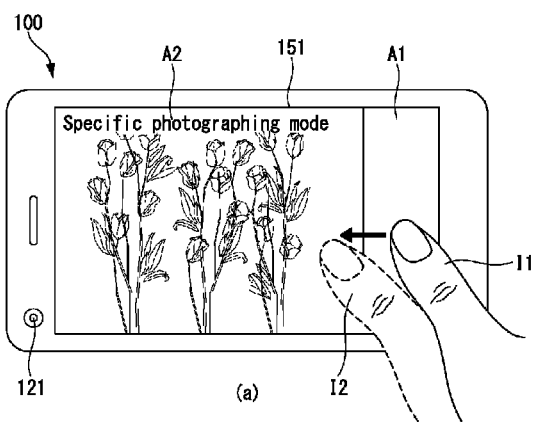
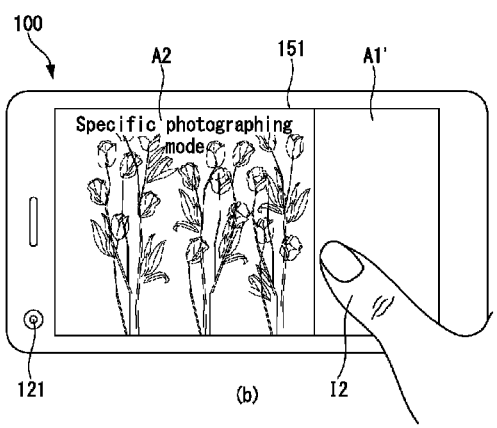

[Figure 9]
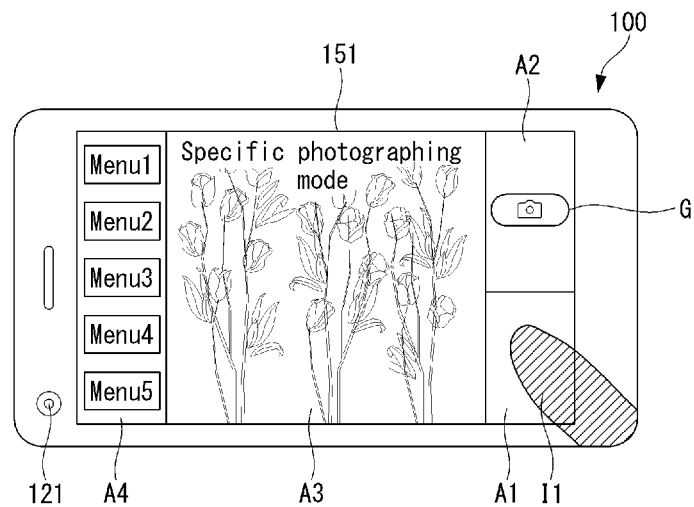
[Figure 10]
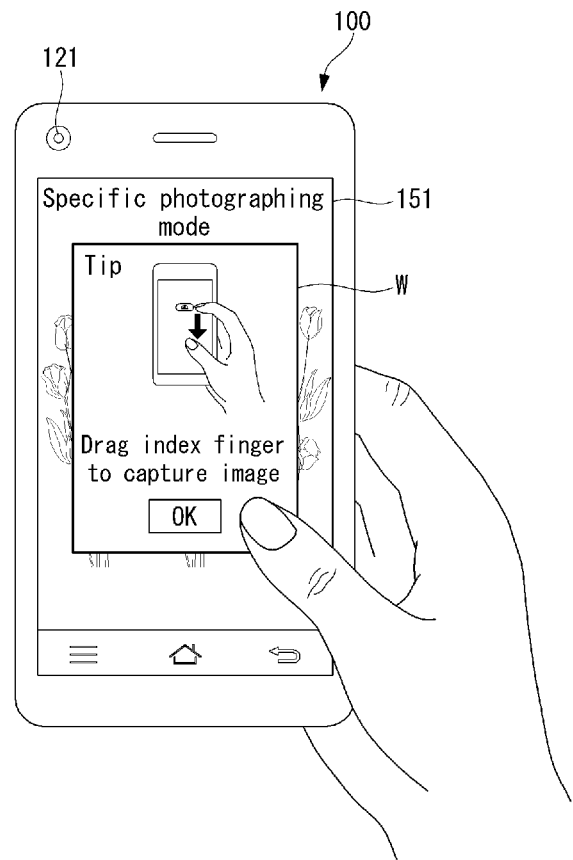

[Figure 11]
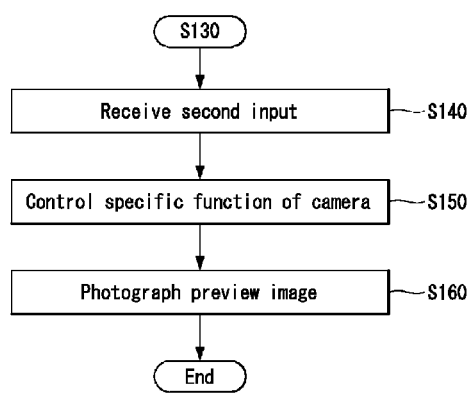

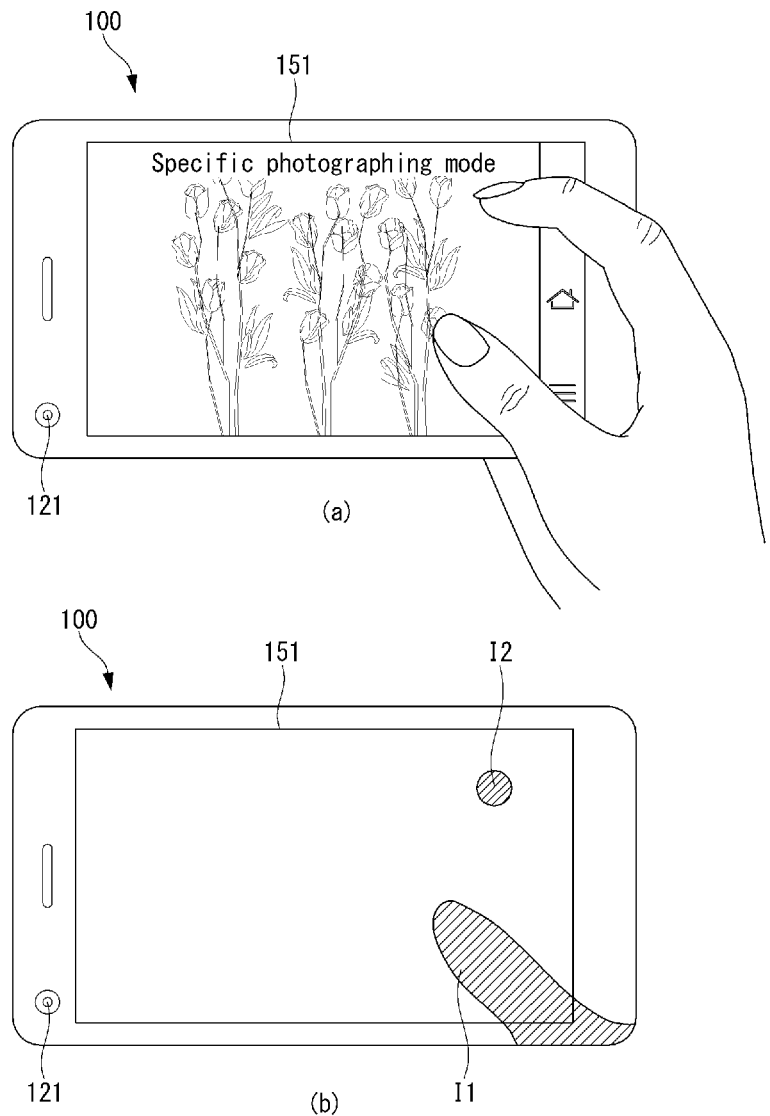
[Figure 12]

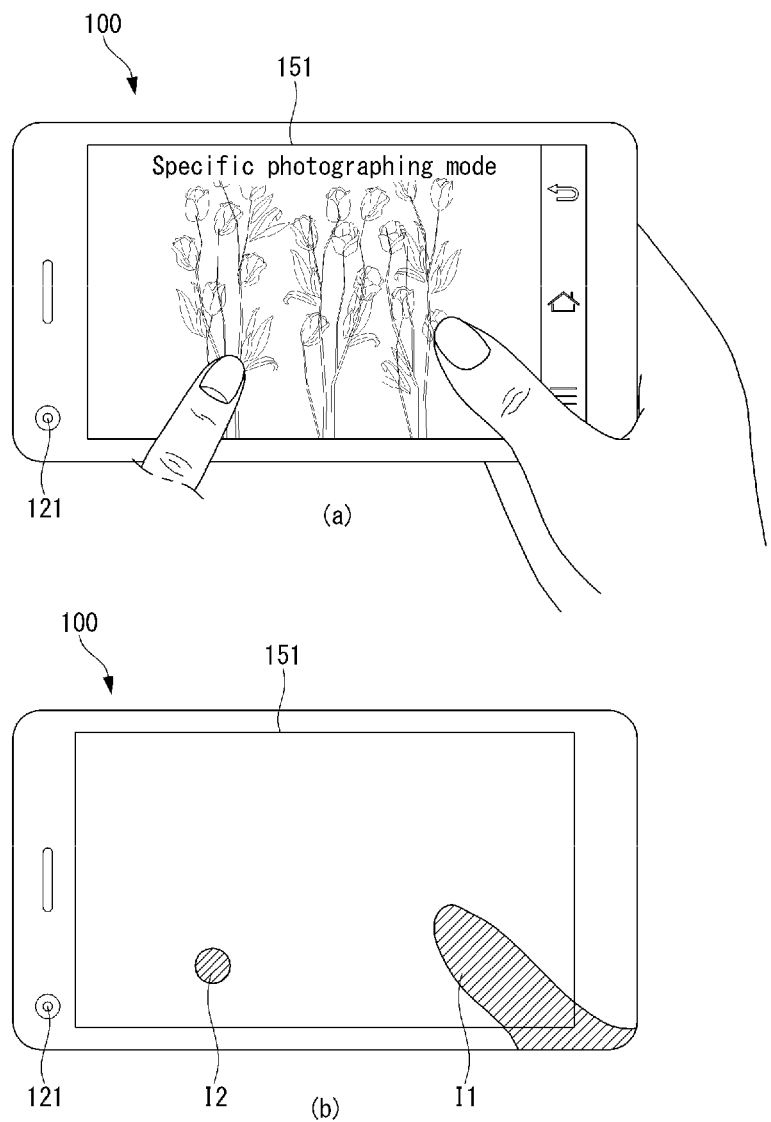
[Figure 13]

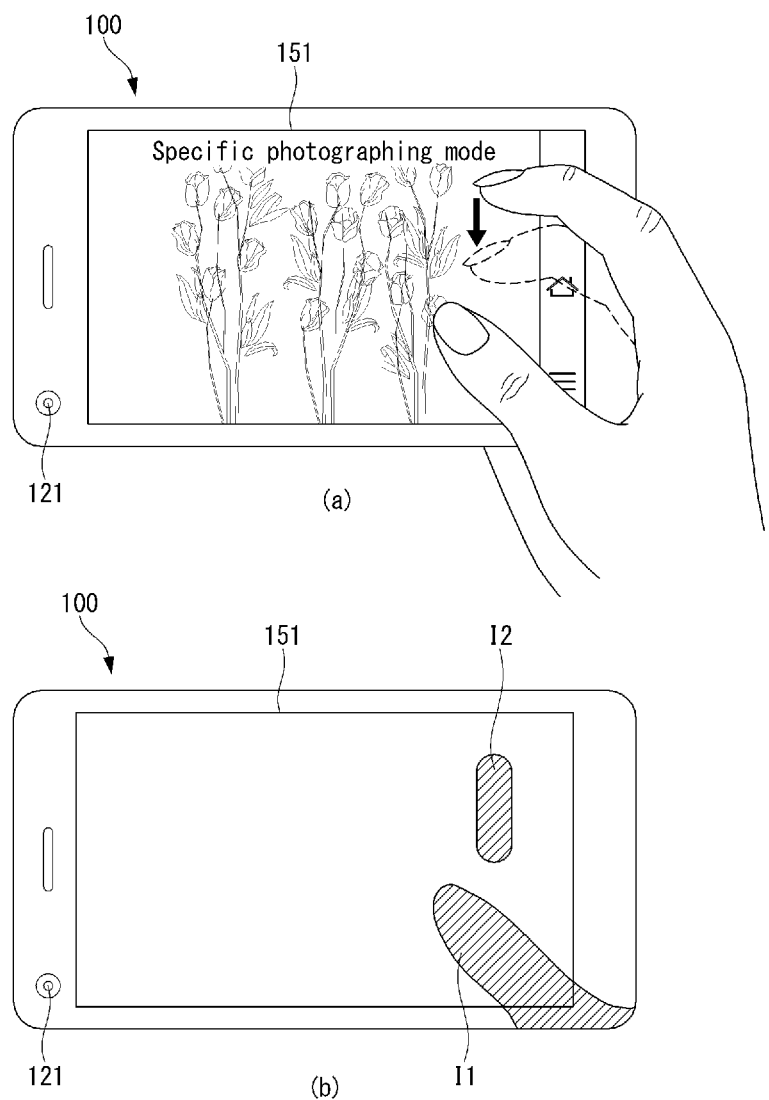

[Figure 15]
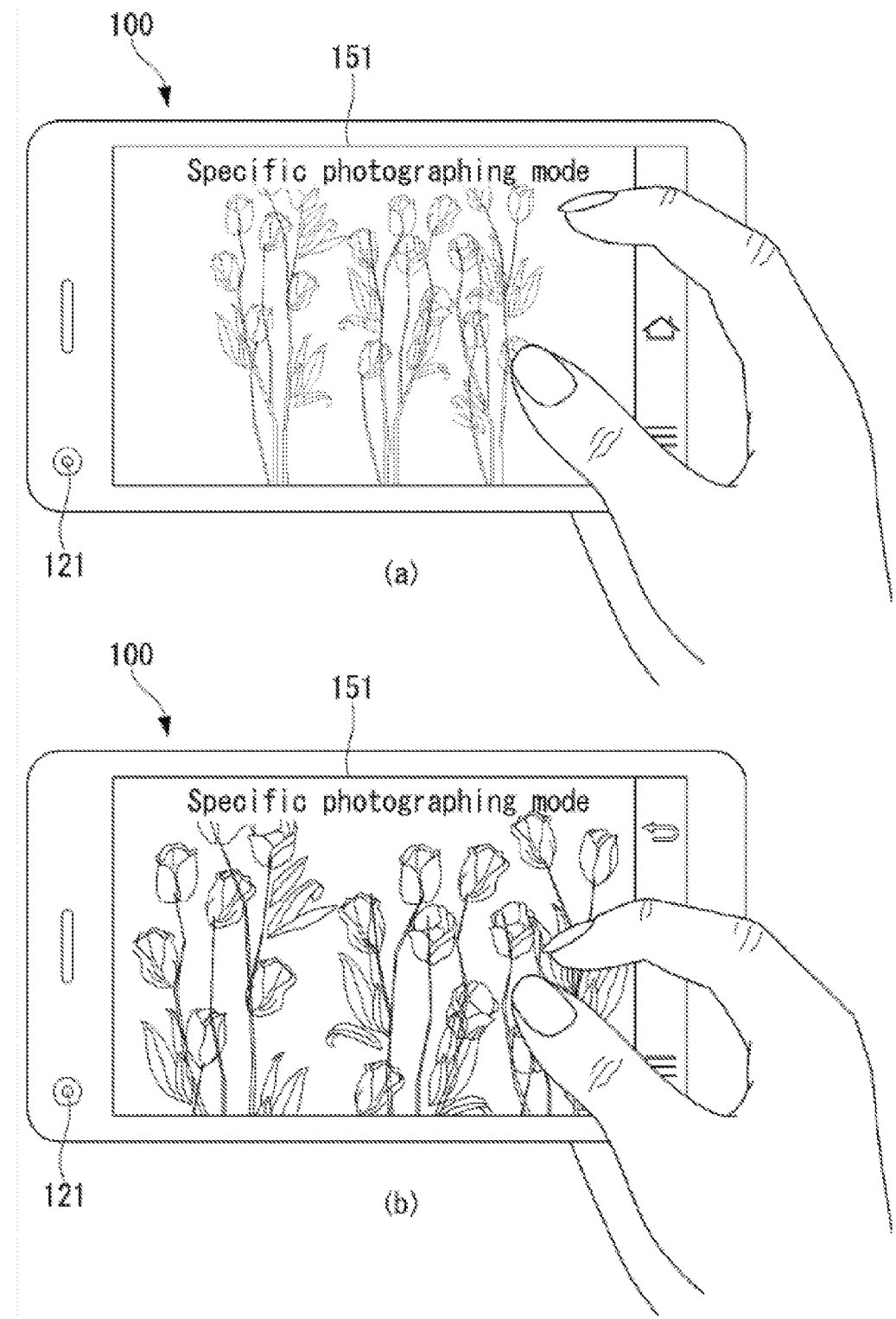

【Figure 16】
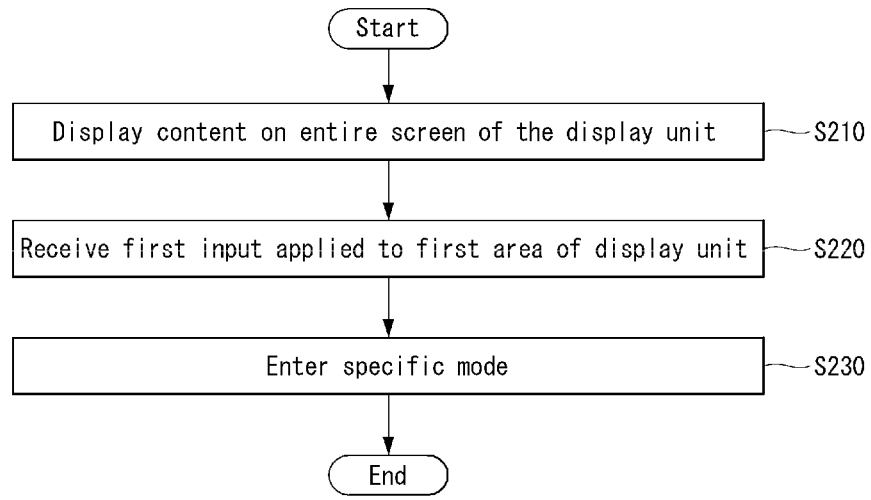
【Figure 17】
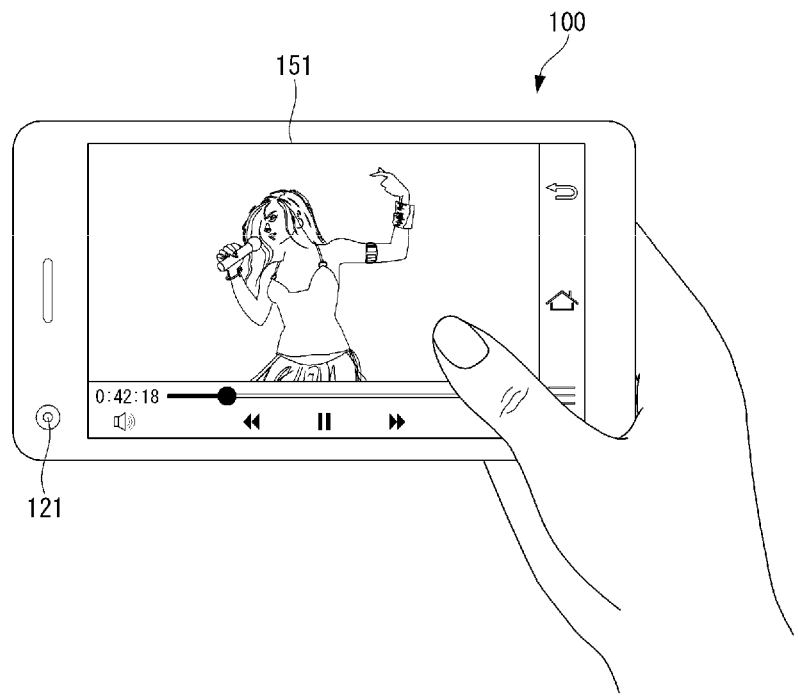

[Figure 18]
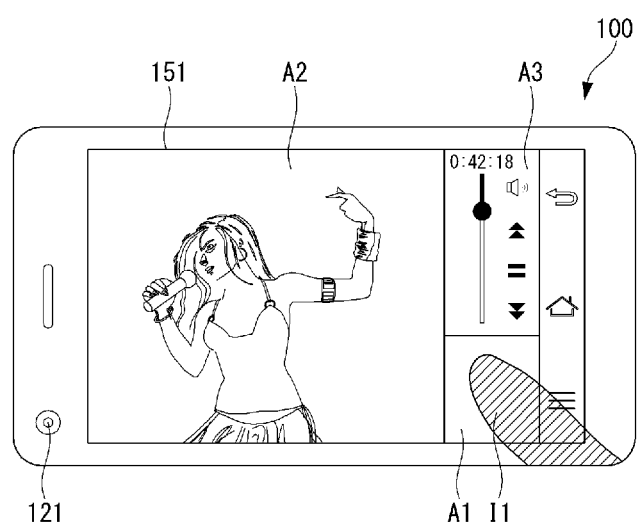

MOBILE TERMINAL AND METHOD FOR CONTROLLING THE SAME

CROSS-REFERENCE TO RELATED APPLICATIONS

This application is the National Stage filing under 35 U.S.C. 371 of International Application No. PCT/KR2015/000569, filed on Jan. 20, 2015, which claims the benefit of earlier filing date and right of priority to Korean Application No. 10-2014-0071022, filed on Jun. 11, 2014, the contents of which are all hereby incorporated by reference herein in their entirety.

TECHNICAL FIELD

The present invention relates to a mobile terminal which changes an operation mode according to an input gesture and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, thin mobile terminals have been manufactured and the bezel widths thereof have been reduced in order to extend a display area. Accordingly, it is difficult for users to grip terminals without applying unnecessary input and a noise input applied to a display area during execution of a specific application causes a wrong operation.

DISCLOSURE

Technical Problem

An object of the present invention is to solve the aforementioned problem and other problems. Another object of the present invention is to provide a mobile terminal which recognizes a first input, which is applied to a first area of a display unit displaying a preview screen or content, as a triggering signal for entering a specific photographing mode or a specific mode and a method for controlling the same.

Technical Solution

According to one aspect of the present invention to accomplish the aforementioned object and other objects, there is provided a mobile terminal, including: a camera; a display unit; and a controller configured to recognize a first input, applied to a first area of the display unit on which a preview image obtained by driving the camera is displayed, as a triggering signal for entering a specific photographing mode and to enter the specific photographing mode, upon reception of the first input.

According to another aspect of the present invention, there is provided a mobile terminal, including: a display unit; and a controller configured to execute a specific application to display content corresponding to one of an image, video and text on the entire screen of the display unit, to recognize a first input applied to a first area of the display unit as a triggering signal for entering a specific mode and to enter the specific mode upon reception of the first input.

According to another aspect of the present invention, there is provided a method for controlling a mobile terminal, including: driving a camera to display a preview image on a display unit; receiving a first input applied to a first area of the display unit on which the preview image is displayed; and recognizing the first input as a triggering signal for entering a specific photographing mode and entering the specific photographing mode.

According to another aspect of the present invention, there is provided a method for controlling a mobile terminal, including: displaying one of an image, video and text on the entire screen of a display unit; receiving a first input applied to a first area of the display unit; and recognizing the first input as a triggering signal for entering a specific mode and entering the specific mode.

Advantageous Effects

The mobile terminal and the method for controlling the same according to the present invention have the following advantages.

According to at least one embodiment of the present invention, it is possible to improve grip of the mobile terminal and stably hold the mobile terminal by processing a grip gesture of a user during execution of a specific application as a valid input.

In addition, according to at least one embodiment of the present invention, it is possible to perform photographing or control a specific function key using an operation of gripping the mobile terminal.

Furthermore, according to at least one embodiment of the present invention, it is possible to dynamically change the size of the bezel region of the mobile terminal as an area to which a grip input is applied dynamically changes.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

The present invention will become more fully understood from the detailed description given herein below and the accompanying drawings, which are given by illustration only, and thus are not limitative of the present invention, and wherein:

FIG. 1a is a block diagram of a mobile terminal in accordance with the present disclosure.

FIGS. 1b and 1c are conceptual views of one example of the mobile terminal, viewed from different directions.

FIG. 2 is a flowchart illustrating a method for controlling the mobile terminal according to one embodiment of the present disclosure;

FIGS. 3 to 10 are views for explaining the method for controlling the mobile terminal according to one embodiment of the present disclosure;

FIG. 11 is a flowchart illustrating a method for controlling the mobile terminal according to another embodiment of the present disclosure;

FIGS. 12 to 15 are views for explaining the method for controlling the mobile terminal according to another embodiment of the present disclosure;

FIG. 16 is a flowchart illustrating a method for controlling the mobile terminal according to another embodiment of the present disclosure; and FIGS. 17 and 18 are views for explaining the method for controlling the mobile terminal according to another embodiment of the present disclosure.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being connected with another element, the element can be connected with the other element or intervening elements may also be present. In contrast, when an element is referred to as being directly connected with another element, there are no intervening elements present.

A singular representation may include a plural representation unless it represents a definitely different meaning from the context. Terms such as include or has are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term proximity touch will often be referred to herein to denote the scenario in which a pointer is positioned to be proximate to the touch screen without contacting the touch screen. The term contact touch will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an identifying device) may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an array camera. When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Embodiments of the present invention will now be described.

FIG. 2 is a flowchart illustrating a method for controlling the mobile terminal according to one embodiment of the present disclosure and FIGS. 3 to 10 are views for explaining the method for controlling the mobile terminal according to one embodiment of the present disclosure.

Referring to FIG. 2, the controller (180 of FIG. 1) of the mobile terminal may drive the camera (121 of FIG. 1) to display a preview screen on the display unit (151 of FIG. 1) (S110).

Specifically, the controller may execute a camera application to drive the camera upon reception of touch input applied to an icon indicating the camera application or input applied to an operation key provided to the terminal body.

The controller may display a preview screen of an image input through the front or rear camera on the display unit when the camera is driven. Here, the controller may display at least one of an image input through the front camera and an image input through the rear camera on the preview screen according to setting. In a dual camera mode, the controller may respectively display the images input through the front and rear cameras in allocated areas of the preview screen. In addition, when an image received in real time is changed according to camera operation, the controller may display the changed image through on the preview screen.

Subsequently, the controller (180 of FIG. 1) may receive a first input applied to a first area of the display unit (151 of FIG. 1) on which the preview screen is displayed (S120). Here, the first input may be set to touch input fixed to the first area for a reference time or more. The controller may recognize the first input as a triggering signal when the first input is maintained for a predetermined time.

The first area of the display unit may refer to an area including at least one of an edge region of the display unit and a bezel region of the display unit, that is, an area touched by the thumb of a user when the user grips the mobile terminal with a hand. For example, the first area of the display unit can correspond to an edge region of the display unit, in which the joint of the thumb of the user is positioned, and a specific area of the display unit, in which the tip of the nail of the thumb is positioned, when the user's hand grips the mobile terminal. When the edge region of the display unit is not touched by the user's hand when the user grips the mobile terminal with the hand, the first area of the display unit may correspond to a bezel region of the display unit, in which the thumb of the user is positioned, and the specific region of the display unit. That is, the first area of the display unit may refer to an area in the form of the user's thumb when the user's thumb completely comes into contact with the display unit when the user grips the mobile terminal with the hand. When the user's thumb partially comes into contact with the display unit, the first area may refer to the contact area of the display unit.

Upon reception of the first input, the controller (180 of FIG. 1) may recognize the first input as a triggering signal for entering a specific photographing mode (S130).

The controller may recognize the first input as a valid input for maintaining a specific photographing mode upon entering the specific photographing mode and set an input received in the specific photographing mode as an input for executing a function different from a function in a normal photographing mode. Upon entering the specific photographing mode, the controller may rearrange function keys related to photographing or reset input patterns for the function keys. For example, the controller can change a photographing icon display position to rearrange a photographing icon in an area above the first area upon entering the specific photographing mode.

The display screen of the display unit may be segmented into a plurality of areas and the preview screen may be displayed in one of the areas other than the first area. Specifically, the controller may recognize the first area as a bezel region and display the preview screen in an area other than the first area in the specific photographing mode. The controller may display at least one of a photographing menu, a photographing function key, a notice and a preview image acquired through a dual camera in an area other than the first area.

Upon simultaneous reception of the first input and an input for turning on the display unit (151 of FIG. 1) when the display unit is turned off, the controller (180 of FIG. 1) may display an execution screen of the specific photographing mode on the display unit (151 of FIG. 1). That is, the controller may perform shortcut to the specific photographing mode execution screen.

Upon release of the first input applied to the first area, the controller may change the specific photographing mode to the normal photographing mode. The controller may display the rearranged photographing related function keys at the initial positions thereof and recover the input patterns for the function keys upon switching of the specific photographing mode to the normal photographing mode.

Upon reception of the first input, the controller (180 of FIG. 1) may display a pop-up window for guiding switching to the specific photographing mode and release of the specific photographing mode, on the display unit (151 of FIG. 1).

A description will be given of the method for controlling the mobile terminal according to one embodiment of the present invention with reference to FIGS. 3 to 10.

Referring to FIG. 3, the controller (180 of FIG. 1) may execute the camera application upon reception of touch input applied to an icon (a) which indicates the camera application.

Upon execution of the camera application, the controller may drive the camera to display a preview image, input through the camera, on the display unit. The controller may be configured to enter the normal photographing mode upon execution of the camera application and display photographing related function keys on the preview image in the normal photographing mode.

FIGS. 4a, 4b and 4c are views for explaining a method of receiving the first input in the mobile terminal according to the present invention. The controller (180 of FIG. 1) may receive the first input applied to the first area of the display unit, which includes one of a bezel region and an edge region of the display unit.

Specifically, referring to FIG. 4a, the controller may receive the first input applied to an area including the bezel region of the display unit. Referring to FIGS. 4b and 4c, the controller may receive the first input applied to an area including the edge region of the display unit. Here, one or more inputs may be received as the first input.

FIGS. 5a, 5b and 5c are views for explaining the first area I1 in the mobile terminal according to the present invention. The controller (180 of FIG. 1) may recognize an area including one of the bezel region and edge region of the display unit, which is touched when the user grips the mobile terminal with a hand, as the first area I1.

Specifically, referring to FIGS. 5a, 5b and 5c, the controller may determine an area of the display unit, which is touched by a user's thumb when the user grips the mobile terminal with a hand, as the first area I1. In addition, the controller may determine a specific area including the area of the display unit, which is touched by the user's thumb, as the first area I1.

FIGS. 6a, 6b and 6c are views for explaining a method of entering a specific photographing mode upon reception of the first input in the mobile terminal according to the present invention.

Referring to FIGS. 6a, 6b and 6c, upon reception of the first input applied to the first area of the display unit on which a preview image is displayed, the controller (180 of FIG. 1) may recognize the first input as a triggering signal for entering the specific photographing mode and switch the normal photographing mode to the specific photographing mode.

Upon switching to the specific photographing mode, the controller may display an indicator (e.g. a character, a symbol or the like) indicating the specific photographing mode on the preview image and rearrange a function key related to photographing. Specifically, the controller may display a guide emoticon G for inducing a second input for executing a photographing function in an upper region of the first area.

FIGS. 7a, 7b and 7c are views for explaining the method for controlling the mobile terminal according to the present invention when the mobile terminal enters the specific photographing mode.

Referring to FIGS. 7a, 7b and 7c, upon entering the specific photographing mode, the controller (180 of FIG. 1) may segment the display screen of the display unit into a plurality of areas A1, A2 and A3 and display a preview image in one area A2 other than the first area A1 and A3.

Here, the controller may visually display boundaries of the areas A1, A2 and A3. The controller may segment the display screen into an area for receiving the first input and an area for displaying a preview image. The controller may reduce an image input through the camera on the basis of the size of the area for displaying a preview image and display the reduced image in the area.

FIG. 8 is a view for explaining a method of controlling the size of the first area in the specific photographing mode of the mobile terminal according to the present invention.

Referring to FIG. 8, upon entering the specific photographing mode, the controller (180 of FIG. 1) may adjust the size of the first area A1 through drag input I2 applied to the first area A1. For example, the controller can magnify the first area A1 through left drag input I2 applied to the first area A1 so as to display a changed first area A1'.

The controller may adjust the size of the area for displaying a preview image in response to the changed size of the first area A1.

FIG. 9 is a view for explaining a method of controlling the display unit in the specific photographing mode of the mobile terminal according to the present invention.

Referring to FIG. 9, upon entering the specific photographing mode, the controller (180 of FIG. 1) of the mobile terminal may segment the display screen of the display unit (151 of FIG. 1) into a plurality of areas A1 to A4 and display at least one of a photographing menu, a photographing function key, a notice and a preview image acquired through a dual camera, in the areas A1 to A4.

Specifically, the controller may segment the display screen into four areas A1 to A4 and display a preview image, the photographing menu and the photographing function key in the three areas A2, A3 and A4 other than the first area A1. The method of segmenting the display screen is exemplary and the controller may segment the display screen into five or more areas.

FIG. 10 is a view for explaining a method of displaying a pop-up window W for guiding switching to the specific photographing mode and release of the specific photographing mode in the mobile terminal 100 according to the present invention.

Referring to FIG. 10, upon reception of the first input, the controller (180 of FIG. 1) of the mobile terminal may display, on the display unit 151, the pop-up window W for indicating switching from the normal photographing mode to the specific photographing mode and guiding a method of performing photographing in the specific photographing mode.

Upon release of the first input, the controller may display, on the display unit, a pop-up window (not shown) for indicating switching from the specific photographing mode to the normal photographing mode and guiding a method of performing photographing in the normal photographing mode.

FIG. 11 is a flowchart illustrating a method for controlling mobile terminal according to another embodiment of the present invention and FIGS. 12 to 15 are views for explaining the method for controlling mobile terminal according to another embodiment of the present invention.

Referring to FIG. 11, the controller (180 of FIG. 1) of the mobile terminal may receive a second input applied to an area other than the first area while the first input is maintained (S140).

When an icon for guiding the second input is displayed on the display unit, the controller may receive the second input through the icon. When the photographing function key is not displayed, the controller may receive the second input through an arbitrary area other than the first area.

The second input may include at least one of touch input, drag input, touch release input and drag release input and the controller may execute a function depending on the type, direction and magnitude of the second input.

Upon reception of the second input corresponding to drag input or drag release input, the controller (180 of FIG. 1) may control a specific function of the camera (S150). Specifically, when the second input is drag input or drag release input, the controller may control at least one of zoom-in, zoom-out, brightness, focus, photographing mode and resolution of the camera on the basis of the direction or magnitude of the second input.

In addition, when the second input corresponds to touch input or touch release input with respect to the photographing function key, the controller (180 of FIG. 1) may control a preview image to be photographed (S160).

The controller may control a specific function to be executed upon reception of touch input or drag input and control a specific function to be executed upon reception of touch release input or drag release input.

The method for controlling the mobile terminal according to another embodiment of the present invention will now be described with reference to FIGS. 12 to 15.

Referring to FIG. 12, the controller (180 of FIG. 1) may receive the second input I2, which is applied to a second area located above the first area using a user's index finger, when the user grips the first area including the edge region of the display unit with a thumb (I1). Here, the second input corresponds to touch input fixed to the second area.

The controller may switch the photographing mode to the specific photographing mode when the user grips the first area, which includes the edge region of the display unit displaying a preview image, with the thumb (I1) and control the preview image to be photographed when the user touches the second area (I2) using the index finger in the specific photographing mode.

Referring to FIG. 13, the controller (180 of FIG. 1) may receive the second input I2, which is applied to an arbitrary area other than the first area using a different finger of the user, while the user grips the first area including the edge region of the display unit with the thumb (I1).

The controller may switch the photographing mode to the specific photographing mode when the user grips the first area including the edge region of the display unit displaying the preview image, with the thumb (I1) and control the preview image to be photographed when the user touches the second area (I2) using a different finger in the specific photographing mode.

Referring to FIG. 14, the controller (180 of FIG. 1) may receive the second input I2, which is applied to the second area located above the first area using the index finger, while the user grips the first area including the edge region of the display unit with the thumb (I1). Here, the second input I2 corresponds to drag input applied to the second area.

The controller may switch the photographing mode to the specific photographing mode when the user grips the first area including the edge region of the display unit displaying the preview image with the thumb (I1) and control the preview image to be photographed when the user drags the second area (I2) using the index finger in the specific photographing mode.

Referring to FIG. 15, the controller (180 of FIG. 1) may zoom in the preview image upon reception of the second input corresponding to downward drag input and photograph the zoomed preview image upon reception of drag release input.

In addition, the controller may match a camera function to the type, direction and magnitude of the second input and store the camera function. The controller may control a zoom-in level of the preview image or execute other functions such as zoom out, brightness control and the like on the basis of the type, direction and magnitude of the second input. Upon reception of the second input, the controller may photograph only the preview image displayed on the display unit.

FIG. 16 is a flowchart illustrating a method for controlling the mobile terminal according to another embodiment of the present invention and FIGS. 17 and 18 are views for explaining the method for controlling the mobile terminal according to another embodiment of the present invention.

Referring to FIG. 16, the controller (180 of FIG. 1) of the mobile terminal may display one of an image, video and text on the entire screen of the display unit (151 of FIG. 1) (S210).

Specifically, the controller may execute one of a video play application, a text viewer application and a gallery application and display content on the entire screen of the display unit.

The controller (180 of FIG. 1) may receive the first input applied to the first area of the display unit (151 of FIG. 1) (S220) and recognize the first input as a triggering mode for entering a specific mode.

The first input may be set to touch input fixed to the first area for a reference time or more. The controller may recognize the first input as the triggering signal when the first input is maintained for a predetermined time.

The first area of the display unit may include an area to which at least one of the edge region and the bezel region of the display unit belongs and an area in which content is displayed. Specifically, the first area of the display unit refers to an area including a region of the display unit, which is touched by a user's thumb when the user grips the mobile terminal with a hand, and the area in which content is displayed. For example, the first area of the display unit can correspond to an edge region of the display unit, in which the joint of the thumb of the user is positioned, and a specific area of the display unit, in which the tip of the nail of the thumb is positioned, when the user's hand grips the mobile terminal. When the edge region of the display unit is not touched by the user's hand when the user grips the mobile terminal with the hand, the first area of the display unit may correspond to a bezel region of the display unit, in which the thumb of the user is positioned, and the specific region of the display unit. That is, the first area of the display unit may refer to an area in the form of the user's thumb when the user's thumb completely comes into contact with the display unit when the user grips the mobile terminal with the hand. When the user's thumb partially comes into contact with the display unit, the first area may refer to the contact area of the display unit.

Upon entering a specific mode, the controller may recognize the first input as a valid input for maintaining the specific mode and set an input received in the specific mode such that the input is used to execute a function different from a function in a content display mode.

Upon entering the specific mode, the controller may segment the display screen of the display unit into a plurality of areas and display content in one of the areas other than the first area. Specifically, the controller may determine one area other than the first area as a content display area, adjust the size of content on the basis of the size of the determined area and display the content in the area. In addition, the controller may display at least one of a function key for controlling content playback, a content play menu and a notice in an area other than the first area. For example, the controller can segment the display screen into first, second and third areas, display content in the third area and display the function key for controlling content playback in the second area.

Upon release of the first input applied to the first area, the controller (180 of FIG. 1) may release the specific mode and switch the specific mode to the content display mode. Upon reception of the first input, the controller (180 of FIG. 1) may display, on the display unit (151 of FIG. 1), a pop-up window for guiding switching to the specific mode and release of the specific mode.

A description will be given of the method for controlling the mobile terminal according to another embodiment of the present invention with reference to FIGS. 17 and 18.

Referring to FIG. 17, the controller (180 of FIG. 1) may display a video on the entire screen of the display unit 151 and receive the first input applied to the first area of the display unit 151.

Specifically, the controller may receive the first input applied to the first area including the edge region of the display unit 151 and an arbitrary area in which the video is displayed. Here, the arbitrary area refers to an area in which a function key related to video playback is not displayed.

Upon reception of the first input for a reference time or more, the controller may recognize the first input as a triggering signal for entering the specific mode, instead of noise. The controller may determine that functions are executed in the specific mode while the first input is maintained and determine that the specific mode is switched to the content playback mode upon release of the first input.

Referring to FIG. 18, upon entering the specific mode, the controller (180 of FIG. 1) may segment the display screen of the display unit 151 into a plurality of areas A1, A2 and A3 and display content in one area other than the first area A1.

Upon switching to the specific mode, the controller may segment the display screen of the display unit into the first area A1 to which the first input is applied, the second area A2 for displaying a video and the third area A3 for displaying the function key related to video playback.

In addition, upon entering the specific mode, the controller may segment the display screen into four or more areas and control menus related to content playback, a notice and the like to be displayed in areas other than the first area.

When shortcut to a content display application is set while the display unit is turned off, the controller may directly enter the specific mode upon simultaneous reception of the first input applied to the display unit and an input for turning on the display unit. Accordingly, the controller may turn on the display unit and display content in one of the segmented areas of the display screen other than the first area.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal, comprising:
   a camera;
   a display unit; and
   a controller configured to:
   cause the display unit to display a preview image obtained through the camera;
   receive a first input applied to a first area of the display unit on which the preview image is displayed;

change a mode of the camera to enter a specific photographing mode from a normal photographing mode by recognizing the first input as a triggering signal;

cause photographing of the preview image in response to a second input applied to an area of the preview image other than the first area, the second input applied in the specific photographing mode while the first input is maintained at the first area; and detect whether a portion of a body of the mobile terminal is gripped by a user's one hand, the first input corresponding to a touch input applied by the user's one hand to the first area, wherein a size of a first touched area by the first input is larger than a size of a second touched area by the second input.

2. The mobile terminal of claim 1, wherein:
the preview image is displayed on an entire screen of the display unit; and
the first area corresponds to an area including at least one of an edge region of the display unit or a bezel region of the display unit.

3. The mobile terminal of claim 1, wherein the controller is further configured to cause the display unit to display an icon for guiding the second input in the specific photographing mode.

4. The mobile terminal of claim 1, wherein the controller is further configured to control at least one of zoom-in, zoom-out, brightness, focus, photographing mode or resolution on the basis of a direction or magnitude of the second input.

5. The mobile terminal of claim 1, wherein the second input corresponds to one of a touch input applied to one point, a drag input applied to the point, release of the touch input applied to the point, or release of the drag input applied to the point.

6. The mobile terminal of claim 1, wherein the controller is further configured to cause the display unit to display the preview image in one of separate display areas other than the first area, upon entering the specific photographing mode, the separate display areas including the first area and indicating segmented display areas.

7. The mobile terminal of claim 6, wherein the controller is further configured to cause the display unit to display at least one of a photographing menu, a photographing function key, a notice or a preview image obtained through a dual camera, in the one of separate display areas other than the first area.

8. The mobile terminal of claim 6, wherein the controller is further configured to adjust a size of each of the separate display areas in response to receiving a drag input applied to the first area.

9. The mobile terminal of claim 1, wherein the controller is further configured to change the specific photographing mode to the normal photographing mode upon release of the first input.

10. The mobile terminal of claim 1, wherein the controller is further configured to recognize the first input as the triggering signal when the first input is maintained for a predetermined time.

11. The mobile terminal of claim 1, wherein the controller is further configured to cause the display unit to display an execution screen of the specific photographing mode upon simultaneous reception of the first input and an input for turning on the display unit when the display unit is turned off.

12. The mobile terminal of claim 1, wherein the controller is further configured to cause the display unit to display a pop-up window for guiding entering the specific photographing mode and release of the specific photographing mode upon reception of the first input.

13. The mobile terminal of claim 12, wherein the controller is further configured to change the specific mode to a normal mode upon release of the first input.

* * * * *